(12) United States Patent
Kudo

(10) Patent No.: US 12,270,796 B2
(45) Date of Patent: Apr. 8, 2025

(54) DETECTION METHOD, ANALYSIS METHOD, ANALYSIS DEVICE AND NON-TRANSITORY COMPUTER READABLE MEDIUM

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 535 days.

(21) Appl. No.: 17/417,489

(22) PCT Filed: Jan. 23, 2019

(86) PCT No.: PCT/JP2019/001999
§ 371 (c)(1),
(2) Date: Jun. 23, 2021

(87) PCT Pub. No.: WO2020/152800
PCT Pub. Date: Jul. 30, 2020

(65) Prior Publication Data
US 2022/0074902 A1 Mar. 10, 2022

(51) Int. Cl.
*G01N 30/84* (2006.01)
*G01N 1/28* (2006.01)
*G01N 27/62* (2021.01)

(52) U.S. Cl.
CPC .............. *G01N 30/84* (2013.01); *G01N 1/28* (2013.01); *G01N 27/62* (2013.01); *G01N 2001/2893* (2013.01)

(58) Field of Classification Search
CPC .............................................. G01N 2001/2893
See application file for complete search history.

(56) References Cited

U.S. PATENT DOCUMENTS

2017/0199166 A1* 7/2017 Hong ................. G01N 30/8665

FOREIGN PATENT DOCUMENTS

WO WO-9522049 A1 * 8/1995 ............. G01N 21/72

OTHER PUBLICATIONS

Chromatography Today, What is a Response Factor, https://www.chromatographytoday.com/news/gc-mdgc/32/breaking-news/what-is-a-response-factor/31169 (Year: 2014).*

(Continued)

*Primary Examiner* — Paul S Hyun
*Assistant Examiner* — Mickey Huang
(74) *Attorney, Agent, or Firm* — Sughrue Mion, PLLC

(57) ABSTRACT

A detection method includes acquiring at least one first relative response factor obtained by measurement of a sample having a same component as at least one component included in a subject sample at a known concentration and a sample having at least one compound at a known concentration, or at least one first threshold value based on each of the at least one first relative response factor, measuring the subject sample and a sample including the at least one compound, and calculating at least one second relative response factor in regard to at least one component of the subject sample and the at least one compound, and producing first information in regard to a change in concentration of the subject sample based on the at least one first relative response factor or the at least one first threshold value, and the corresponding at least one second relative response factor.

7 Claims, 9 Drawing Sheets

(56) References Cited

OTHER PUBLICATIONS

Jae Woo Kim et al., "Comparison of Screening Method (Py-GC/MS) and Quantitative Method (Solvent Extraction—GC/MS) for Phthalate Esters", Shimadzu Corporation, Jan. 2016, 6 pgs.
International Search Report for PCT/JP2019/001999 dated, Apr. 23, 2019 (PCT/ISA/210).
Written Opinion of the International Searching Authority for PCT/JP2019/001999 dated Apr. 23, 2019 (PCT/ISA/237).

\* cited by examiner

F I G. 1
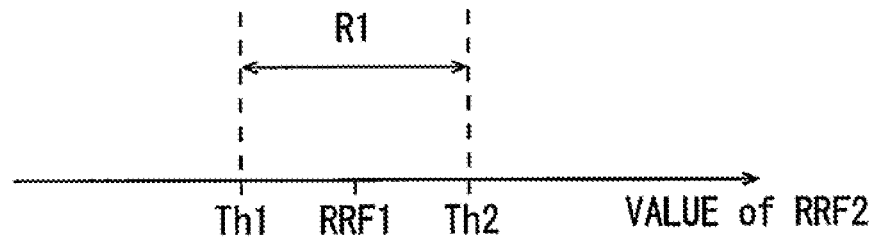

FIG. 2A

CHART 2-A

| NAME OF COMPOUND | REFERENCE COMPOUND A | B | C | D |
|---|---|---|---|---|
| FIRST RELATIVE RESPONSE FACTOR | 1 | 1.0 | 2.0 | 3.0 |
| ALLOWABLE RANGE |  | 0.8-1.2 | 1.6-2.4 | 2.6-3.4 |
| SECOND RELATIVE RESPONSE FACTOR | 1 | 1.1 | 2.1 | 3.2 |
| RESULT OF DETERMINATION |  | PASS | PASS | PASS |

FIG. 2B

CHART 2-B

| NAME OF COMPOUND | REFERENCE COMPOUND A | B | C | D |
|---|---|---|---|---|
| FIRST RELATIVE RESPONSE FACTOR | 1 | 1.0 | 2.0 | 3.0 |
| ALLOWABLE RANGE |  | 0.8-1.2 | 1.6-2.4 | 2.6-3.4 |
| SECOND RELATIVE RESPONSE FACTOR | 1 | 0.6 | 2.1 | 3.2 |
| RESULT OF DETERMINATION |  | FAIL | PASS | PASS |

FIG. 3
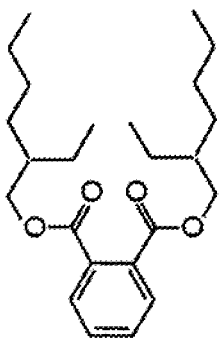
DIBP  M.W.:278
Diisobutyl phthalate
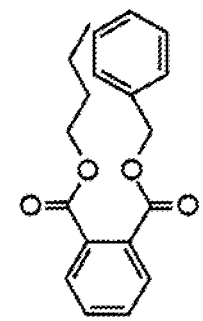
DBP  M.W.:278
Dibutyl phthalate
BBP  M.W.:312
Butylbenzyl phthalate
DEHP  M.W.:390
Di-(2-ethylhexyl) phthalate
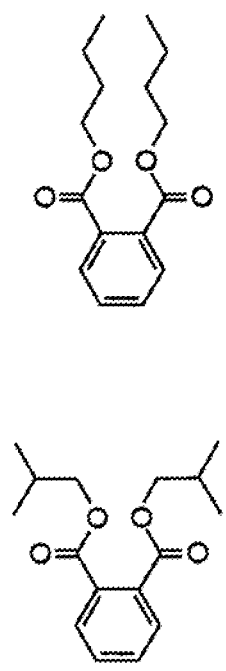
DNOP  M.W.:390
Di-n-octyl phthalate
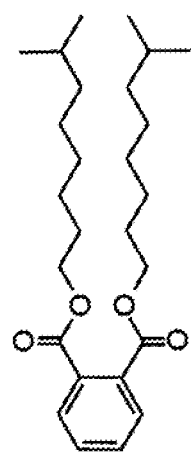
DINP  M.W.:418
Di-iso-nonyl phthalate
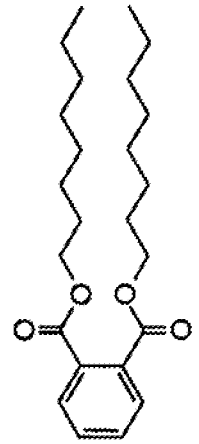
DIDP  M.W.:446
Diisodecyl phthalate

FIG. 6A

CHART 6-A

| NAME OF COMPOUND | REFERENCE COMPOUND A | B | C | D |
|---|---|---|---|---|
| FIRST RELATIVE RESPONSE FACTOR | 1 | 1.0 | 2.0 | 3.0 |
| ALLOWABLE RANGE |  | 0.8-1.2 | 1.6-2.4 | 2.6-3.4 |
| SECOND RELATIVE RESPONSE FACTOR | 1 | 2.2 | 4.2 | 6.4 |
| RESULT OF DETERMINATION |  | FAIL | FAIL | FAIL |

FIG. 6B

CHART 6-B

| NAME OF COMPOUND | A | REFERENCE COMPOUND B | C | D |
|---|---|---|---|---|
| FIRST RELATIVE RESPONSE FACTOR | 1.0 | 1 | 2.0 | 3.0 |
| ALLOWABLE RANGE | 0.8-1.2 |  | 1.6-2.4 | 2.6-3.4 |
| SECOND RELATIVE RESPONSE FACTOR | 0.5 | 1 | 2.1 | 3.2 |
| RESULT OF DETERMINATION | FAIL |  | PASS | PASS |

FIG. 7

CHART 7

| NAME OF COMPOUND | A | B | C | D |
|---|---|---|---|---|
| RESULT OF DETERMINATION WITH A AS REFERENCE COMPOUND | | FAIL | FAIL | FAIL |
| RESULT OF DETERMINATION WITH B AS REFERENCE COMPOUND | FAIL | | PASS | PASS |
| RESULT OF DETERMINATION WITH C AS REFERENCE COMPOUND | FAIL | PASS | | PASS |
| RESULT OF DETERMINATION WITH D AS REFERENCE COMPOUND | FAIL | PASS | PASS | |
| NUMBER OF PASSES | 0 | 2 | 2 | 2 |
| NUMBER OF FAILS | 3 | 1 | 1 | 1 |
| RESULT OF INTEGRATED DETERMINATION | FAIL | PASS | PASS | PASS |

DETECTION METHOD, ANALYSIS METHOD, ANALYSIS DEVICE AND NON-TRANSITORY COMPUTER READABLE MEDIUM

CROSS REFERENCE TO RELATED APPLICATIONS

This application is a National Stage of International Application No. PCT/JP2019/001999 filed Jan. 23, 2019.

TECHNICAL FIELD

The present invention relates to a detection method, an analysis method, an analysis device and a non-transitory computer readable medium storing a program.

BACKGROUND ART

A reagent used for an analysis is degraded over time, and its concentration is changed. In a case where a concentration of a standard sample used for adjustment of an analysis device is changed in particular, an analysis is greatly affected. The analysis device is adjusted based on the measurement data obtained by measurement of a standard sample having a known concentration before a sample to be analyzed is analyzed by the analysis device. For example, with a mass spectrometer, a calibration curve is created by measurement of a standard sample, and a value of m/z is calibrated with the use of the calibration curve (see Non-patent Document 1). In this case, in order to detect a change in concentration of the standard sample, another standard sample having a known concentration is measured for creation of a calibration curve, and the concentration of the standard sample used for an analysis is measured with the use of the calibration curve.

CITATION LIST

Non Patent Document

[Non Patent Document 1] Kim J W, Moon H M, Maruyama F, Fujimaki S, Kudo Y, Sakamoto Y, Miyagawa H, Nakagawa K, "Comparison of Screening Method (Py-GC/MS) and Quantitative Method (Solvent Extraction-GC/MS) for Phthalate Esters Analysis," [online], 2016, Shimadzu Corporation, [searched on Jan. 22, 2019].

SUMMARY OF INVENTION

Technical Problem

However, it is complicated work to create a calibration curve for measurement of a concentration of a standard sample to be used for an analysis.

Solution to Problem

A first aspect of the present invention relates to a detection method of detecting a change in concentration of a subject sample that includes acquiring at least one first relative response factor obtained by measurement of a sample having a same component as at least one component included in the subject sample at a known concentration and a sample having at least one compound at a known concentration, or at least one first threshold value based on each of the at least one first relative response factor, measuring the subject sample and a sample including the at least one compound, and calculating at least one second relative response factor in regard to at least one component of the subject sample and the at least one compound, and producing first information in regard to a change in concentration of the subject sample based on the at least one first relative response factor or the at least one first threshold value, and the corresponding at least one second relative response factor.

A second aspect of the present invention relates to an analysis method including producing the first information in regard to whether the concentration of the subject sample is changed by the detection method of the first aspect and performing an analysis using the subject sample based on the first information.

A third aspect of the present invention relates to an analysis device including a first relative response factor acquirer that acquires at least one first relative response factor obtained by measurement of a sample having a same component as at least one component included in a subject sample at a known concentration and a sample including at least one compound at a known concentration, or at least one first threshold value based on each of the at least one first relative response factor, a measurer that measures the subject sample and a sample including the at least one compound, a second relative response factor calculator that calculates at least one second relative response factor in regard to at least one component of the subject sample and the at least one compound based on measurement data obtained by the measurement, and an information producer that produces first information in regard to a change in concentration of the subject sample based on the at least one first relative response factor or the at least one first threshold value, and the corresponding at least one second relative response factor.

A fourth aspect of the present invention relates to a non-transitory computer readable medium storing a program causing a processing device to execute a first relative response factor acquisition process of acquiring at least one first relative response factor obtained by measurement of a sample having a same component as at least one component included in a subject sample at a known concentration and a sample including at least one compound at a known concentration, or at least one first threshold value based on each of the at least one first relative response factor, a second relative response factor calculation process of calculating at least one second relative response factor in regard to at least one component of the subject sample and the at least one compound based on measurement data obtained by measurement of the subject sample and a sample including the at least one compound, and an information production process of producing first information in regard to a change in concentration of the subject sample based on the at least one first relative response factor or the at least one first threshold value, and the corresponding at least one second relative response factor.

Advantageous Effects of Invention

The present invention enables detection of a change in concentration of a reagent without a complicated operation.

BRIEF DESCRIPTION OF THE DRAWINGS

FIG. 1 is a conceptual diagram for explaining a detection method of one embodiment.

FIGS. 2A and 2B are charts for explaining determination in regard to whether a concentration of each component of a subject sample is changed.

FIG. 3 is a diagram showing esters of phthalic acid.

FIGS. 6A and 6B are charts for explaining determination in regard to whether a concentration of each component of a subject sample is changed.

FIG. 7 is a chart for explaining determination in regard to whether a concentration of each component of a subject sample is changed in a case where a plurality of reference compounds are used.

DESCRIPTION OF EMBODIMENTS

Figure 4:
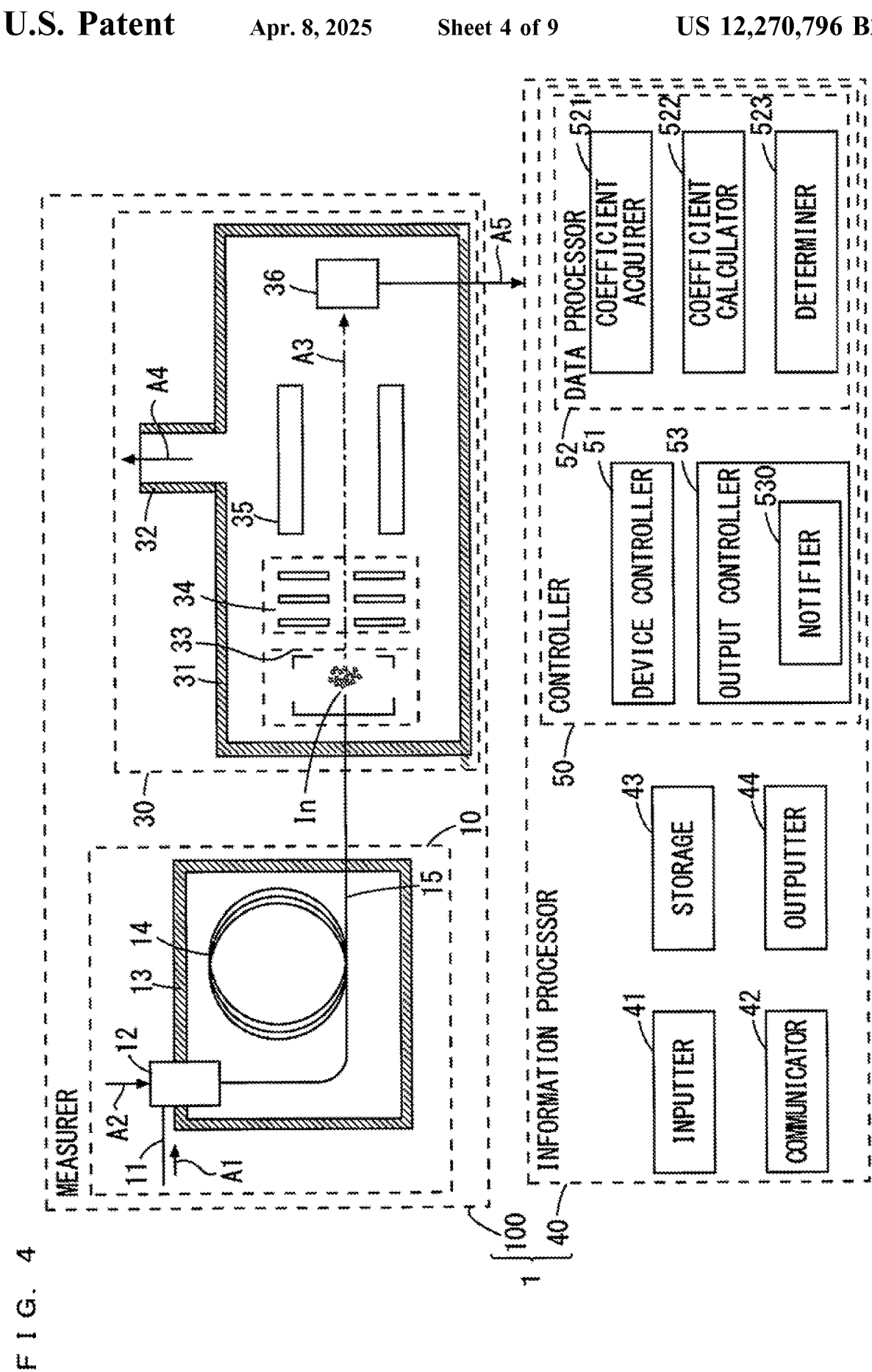
FIG. 4 is a conceptual diagram showing the configuration of an analysis device according to the one embodiment.

Embodiments of the present invention will be described below with reference to the drawings.

First Embodiment

With a detection method of the present embodiment, a change in concentration of a component included in a sample is detected. Hereinafter, a sample subject to detection of a change in concentration and its component are referred to as a subject sample and a subject component, respectively. With the detection method of the present embodiment, information in regard to a change in concentration of a subject sample is produced based on a first relative response factor that is obtained in advance and a second relative response factor that is obtained by measurement of the subject sample and a sample having a reference compound. Hereinafter, this information is referred to as concentration change information.

(Acquisition of First Relative Response Factor)

A sample having the same component as a subject component at a known concentration and a sample having a reference compound at a known concentration are measured, and a first relative response factor is acquired based on data (hereinafter referred to as first measurement data) obtained by the measurement. This measurement method is not limited in particular as long as a quantitative analysis can be performed. For example, at least one of gas chromatography, liquid chromatography, mass spectrometry, gas chromatography/mass spectrometry (GC/MS), liquid chromatography/mass spectrometry (LC/MS), fourier transform infrared spectroscopy and spectrophotometry using ultraviolet visible light can be used. Hereinafter, a compound equivalent to a subject component is referred to as a subject compound.

A Relative Response Factor (RRF) is expressed by a rate of a Response Factor (RF) of two compounds. Letting a weight of a measured compound be M, and letting an intensity obtained by measurement be A, a response factor RF is expressed by the following formula (1)

$$RF = A/M \qquad (1)$$

A relative response factor of a subject compound S with respect to a reference compound R is $RRF_{S/R}$. Letting a weight of a measured reference compound R be $M_R$, letting an intensity obtained by measurement be $A_R$, letting a weight of a measured subject compound S be $M_S$ and letting an intensity obtained by measurement be $A_S$, $RRF_{S/R}$ is expressed by the following formula (2).

$$RRF_{S/R} = (A_S/M_S)/(A_R/M_R) \qquad (2)$$

Letting a concentration of a reference compound R used in measurement for acquisition of $RRF_{S/R}$ be $C_R$, letting a concentration of a subject compound S be $C_S$, and letting a volume of a measured sample be V, $M_R = C_R \times V$, $M_S = C_S \times V$ holds. From this and the above-mentioned formula (2), $RRF_{S/R}$ is defined by the following formula (3).

$$RRF_{S/R} = (A_S/(C_S \times V))/(A_R/(C_R \times V)) = (A_S/C_S)/(A_R/C_R) \qquad (3)$$

Therefore, letting a concentration of a reference compound R used in measurement for acquisition of a first relative response factor $RRF1_{S/R}$ be $C_{R1}$, letting an intensity obtained by the measurement be $A_{R1}$, letting a concentration of a subject compound S be $C_{S1}$ and letting an intensity obtained by the measurement be $A_{S1}$, the first relative response factor $RRF1_{S/R}$ is calculated by the following formula (4).

$$RRF1_{S/R} = (A_{S1}/C_{S1})/(A_{R1}/C_{R1}) \qquad (4)$$

A relative response factor is kept substantially constant in analysis devices of the same model, in particular, mass spectrometers of the same model. In a case where a relative response factor is changed in regard to the same combination of a reference compound R and a subject compound S, on the assumption that the reference compound R and measurement are stable, it can be assumed that an actual concentration of the subject compound S is changed from a value of concentration used for calculation of the relative response factor. Here, a "model" refers to products having measurers that have the same specification. A relative response factor of a subject compound S with respect to a reference compound R is stored in advance as a first relative response factor for each model or each device.

(Calculation of Second Relative Response Factor)

A subject sample and a sample including a reference compound R are measured with the use of a device of the same model as that of the device that has measured a first relative response factor, and a second relative response factor $RRF2_{S/R}$ is calculated based on data (hereinafter referred to as second measurement data) obtained by the measurement. Here, letting a concentration of a reference compound R used in measurement for acquisition of a second relative response factor $RRF2_{S/R}$ be $C_{R2}$, letting an intensity obtained by the measurement be $A_{R2}$, letting a concentration of a subject compound S be $C_{S2}$, and letting an intensity obtained by the measurement be $A_{S2}$, a second relative response factor $RRF2_{S/R}$ is expressed by the following formula (5).

$$RRF2_{S/R} = (A_{S2}/C_{S2})/(A_{R2}/C_{R2}) \qquad (5)$$

While a relative response factor of a subject compound S with respect to a reference compound R is used in the above description, a relative response factor of the reference compound R with respect to the subject compound S may be used. In order to avoid complication, a first relative response factor and a second relative response factor of a subject compound with respect to a reference compound are referred to as RRF1 and RRF2 in the following description, respectively.

(Production of Concentration Change Information)

Concentration change information is produced based on a first relative response factor RRF1 and a second relative response factor RRF2. Whether a concentration of a subject sample is changed is determined based on whether a second relative response factor RRF2 is in an allowable range based on a first relative response factor RRF1. This determination is referred to as concentration change determination. A result of concentration change determination or information in regard to a first relative response factor RRF1 and a second relative response factor RRF2 is produced as concentration change information and presented to an analyst or the like.

FIG. 1 is a conceptual diagram for explaining concentration change determination. In a case where a second relative response factor RRF2 is in an allowable range R1 that is set based on a first relative response factor RRF1, it is determined that a concentration of a subject sample is not changed. In a case where the second relative response factor RRF2 is not in the allowable range R1, it is determined that the concentration of the subject sample is changed. A threshold value (hereinafter referred to as a first determination threshold value Th1) which is a lower limit of the allowable range R1 can be set based on accuracy of analysis and so on, and a value which is 10% or 20% lower than the first relative response factor RRF1 is set, for example. A threshold value (hereinafter referred to as a second determination threshold value) which is an upper limit of the allowable range R1 can be set based on accuracy of analysis and so on, and a value which is 10% or 20% higher than the first relative response factor RRF1 is set, for example. Each of the first determination threshold value Th1 and the second determination threshold value Th2 may be included or not included in the allowable range R1.

FIG. 2A is a diagram showing the chart 2-A for specifically explaining concentration change determination. The chart 2-A represents a case where it is determined in the concentration change determination that concentrations of all of subject compounds are not changed. A compound is A, and subject compounds B, C and D are included in a subject sample.

First relative response factors RRF1 of the subject compounds B, C and D that are obtained in advance with respect to the reference compound A are respectively 1.0, 2.0 and 3.0. Allowable ranges R1 of the subject compounds B, C and D are respectively defined based on these first relative response factors RRF1 as 0.8-1.2, 1.6-2.4 and 2.6-3.4. Second relative response factors RRF2 of the subject compounds B, C and D with respect to the reference compound A that are obtained by actual measurement of the subject sample and the reference compound A are respectively 1.1, 2.1 and 3.2 and in the allowable ranges R1. Therefore, in the concentration change determination, it is determined that none of the concentrations of the subject compounds B, C and D are changed.

FIG. 2B is a diagram showing the chart 2-B for specifically explaining concentration change determination. While allowable ranges R1 similar to those in the chart 2-A are set in the chart 2-B, a second relative response factor of the subject compound B with respect to the compound A is 0.6 and is out of the corresponding allowable range R1 of 0.8-1.2 as a result of measurement. Therefore, in the concentration change determination, it is determined that the concentration of the subject compound B is changed.

(Regarding Reference Compound and Subject Compound)

A reference compound is not limited in particular as long as its concentration is known. However, in a case where a concentration of a reference compound is unstable, the reference compound and another compound that is used as a reference for measurement of the concentration of the reference compound must be measured frequently in order to make certain of the concentration of the reference compound, and it is cumbersome. Therefore, a reference compound is preferably a compound that is unlikely to vaporize, decompose, etc. and is relatively stable in a sample having the reference compound at a known concentration, and is preferably a compound that is more stable than a subject compound in particular. A plurality of reference compounds may be used. In a case where a subject sample includes a plurality of subject compounds, at least one subject compound may be used as a reference compound.

The type of a subject compound included in a subject sample is not limited in particular, and various compounds can be used as subject compounds. The number of subject compounds may be two or more as shown in the charts 2-A and 2-B. In particular, a subject sample is preferably a standard sample that is required to have an accurate concentration in an analysis. A standard sample includes at least one standard substance having a known concentration.

A subject compound is preferably an ester of phthalic acid and is more preferably a phthalate ester. In the following embodiments, a "phthalate ester" refers to an ester of orthophthalic acid, and "esters of phthalic acid" refer to all of esters of an orthophthalic acid, an isophthalic acid and a terephthalic acid.

An ester of phthalic acid suitably included in a subject sample as a subject compound is at least one compound selected from a group including Diisobutyl phathalate (DIBP), Dibutyl phthalate (DBP), Butylbenzyl phthalate (BBP), Di-(2-ethylhexyl) phthalate (DEHP), Di-n-octyl phthalate (DNOP), Diisononyl phathalate (DINP), Diisodecyl phthalate (DIDP), Mono(2-ethylhexyl) phthalate, Dimethyl phthalate (DMP), Diethyl phthalate (DEP), Dipropyl phthalate, Bis(2-methoxyethyl) phthalate, Bis(2-butoxyethyl) phthalate, N-pentyl-isopentyl phthalate, Dipropylheptyl phthalate, Di-n-pentyl phthalate (DPENP), Diisopentyl phthalate (DPENP), Di-n-hexylphthalate (DHEXP), Diisohexyl phthalate, Dicyclohexyl phthalate (DCHP), Dibenzyl phthalate, Diheptyl phthalate, Diisoheptyl phthalate, Dinonyl phthalate, Didecyl phthalate, Diundecyl phthalate, Diisoundecyl phthalate and Diisotridecyl phthalate.

FIG. 3 is a diagram showing the structures of DIBP, DBP, BBP, DEHP, DNOP, DINP and DIDP of the above-mentioned esters of phthalic acid. In the diagram 3, "M.W." indicates a molecular weight. The seven phthalate esters shown in FIG. 3 are approved as regulated substances subject to regulation due to impact on living creatures such as humans or impact on environment in several countries or regions, and it is necessary to prepare an accurate standard sample for measurement of its concentration. Thus, the seven esters of phthalic acid are more preferable as subject compounds.

One suitable example of a reference compound is Bis(2-ethylhexyl) phthalate (DEHP) from a stability point of view. In a case where a subject compound is an ester of phthalic acid, in particular, an ester of phthalic acid that is listed above, it is preferable that DEHP is used as a reference compound.

A subject compound and a reference compound may be dispersed in a solid and included in a sample or may be dispersed in liquid and included in a sample, for measurement. Types of the solid or liquid in which the subject compound or the reference compound is dispersed may be different in measurement for calculation of a first relative response factor RRF1 and measurement for calculation of a second relative response factor RRF2.

(Regarding Analysis Subject)

The detection method of detecting a change in concentration of a subject sample of the present embodiment can be performed before an analysis of any molecule to be analyzed with the use of the subject sample. Similarly to the above-mentioned phthalate esters, although preferably including a chemical substance that is manufactured and distributed industrially or a regulated substance, a molecule to be analyzed is not limited in particular.

(Regarding Analysis Device)

FIG. 4 is a conceptual diagram showing the configuration of an analysis device according to the present embodiment. The analysis device 1 includes a gas chromatograph-mass spectrometer (hereinafter referred to as a GC-MC) and includes a measurer 100 and an information processor 40. The measurer 100 includes a gas chromatograph 10 and a mass spectrometry unit 30. Measurement for calculation of a second relative response factor RRF2 is performed by the analysis device 1.

As long as being able to perform a quantitative analysis, the analysis device according to the present embodiment is not limited in particular. As the analysis device, a gas chromatograph (GC), a liquid chromatograph (LC), a mass spectrometer, a pyrolysis GC-MS, a liquid chromatograph-mass spectrometer (LC-MS), a fourier transform infrared spectrometer, a UV-visible spectrophotometer or the like can be used.

The gas chromatograph 10 includes a carrier gas flow path 11, a sample introducer 12 into which a sample to be analyzed or a subject sample (hereinafter referred to as a "sample or the like") is introduced, a column temperature adjuster 13, a separation column 14 and a sample gas introduction tube 15. The mass spectrometry unit 30 includes a vacuum container 31, an exhaust port 32, an ionizer 33 that ionizes a sample or the like and produces ions In, an ion adjuster 34, a mass separator 35 and a detector 36.

The information processor 40 includes an inputter 41, a communicator 42, a storage 43, an outputter 44 and a controller 50. The controller 50 includes a device controller 51, a data processor 52 and an output controller 53. The data processor 52 includes a coefficient acquirer, a coefficient calculator 522 and a determiner 523. The output controller 53 includes a notifier 530.

The measurer 100 separates a sample or the like into components by a separation analysis and detects the sample or the like.

The gas chromatograph 10 separates a sample or the like into components based on physical properties or chemical properties. A sample or the like is gas or gaseous when being introduced into the separation column 14 and is referred to as a sample gas.

The carrier gas flow path 11 is a flow path for a carrier gas such as helium and introduces the carrier gas into the sample introducer 12 (arrow A1). The sample introducer 12 includes a chamber such as a sample vaporization chamber into which a sample or the like is introduced, temporarily contains the sample or the like injected by an injector (not shown) such as a syringe or an autosampler, vaporizes the sample or the like in a case where the sample or the like is liquid and introduces a sample gas into the separation column 14 (arrow A2).

The separation column 14 includes a column such as a capillary column. The temperature of the separation column 14 is controlled at several hundred ° C. or less by the column temperature adjuster 13 including a column oven or the like. A sample gas is separated into components based on a distribution coefficient between a mobile phase and a stationary phase of the separation column 14, etc., and components into which the sample gas is separated are respectively eluted from the separation column 14 at different times and introduced into the ionizer 33 of the mass spectrometry unit 30 through the sample gas introduction tube 15.

The mass spectrometry unit 30 includes a mass spectrometer, ionizes a sample or the like that has been introduced into the ionizer 33 and detects the sample or the like by mass separation. A path through which ions In produced by the ionizer 33 flow is schematically indicated by the arrow A3.

A method of detecting a sample or the like eluted from a chromatograph is not limited in particular as long as intensities of a reference compound and a subject compound can be acquired, and an absorbance detector or the like may be used. Further, as long as being able to detect ions In corresponding to a sample or the like with desired accuracy by mass spectrometry, the type of a mass spectrometer that constitutes the mass spectrometry unit 30 is not limited in particular. A mass spectrometer that includes one or more mass spectrometry devices of any type may be used.

The vacuum container 31 of the mass spectrometry unit 30 includes the exhaust port 32. The exhaust port 32 is connected to a vacuum exhaust system (not shown) that includes a pump such as a turbo-molecular pump that can realize a high vacuum state such as $10^{-2}$ Pa or less and its auxiliary pump. In FIG. 4, the position at which gas in the vacuum container 31 is exhausted is indicated schematically by the arrow A4.

The ionizer 33 of the mass spectrometry unit 30 includes an ion source and ionizes a sample or the like introduced into the ionizer 33 by electronic ionization. Because a sample or the like is dissociated when being electronically ionized, ions In include fragment ions obtained by dissociation of the sample or the like. Ions In produced by the ionizer 33 are introduced into the ion adjuster 34.

An ionization method performed by the ionizer 33 is not limited in particular as long as ionization can be performed with desired efficiency. In case of GC-MS, chemical ionization or the like may be used. In case of LCMS, an electrospray method or the like can be suitably used.

The ion adjuster 34 of the mass spectrometry unit 30 includes an ion transport system such as a lens electrode or an ion guide and makes adjustment by converging ions In using electromagnetic action, etc. Ions In emitted from the ion adjuster 34 are introduced into the mass separator 35.

The mass separator 35 of the mass spectrometry unit 30 includes a quadrupole mass filter and performs mass separation of introduced ions In. The mass separator 35 causes ions In to pass selectively based on an m/z value by a voltage applied to the quadrupole mass filter. Ions In obtained by mass separation in the mass separator 35 enter the detector 36.

The detector 36 of the mass spectrometry unit 30 includes an ion detector and detects entered ions In. The detector 36 converts a detection signal obtained by detection of entered ions In into a digital signal by an A/D converter (not shown) and outputs the digitalized detection signal to the information processor 40 as measurement data (the arrow A5).

The information processor 40 includes an information processing apparatus such as an electronic calculator and executes processes such as communication, storage, calculation, etc. in regard to various data in addition to serving as an interface with respect to a user of the analysis device 1 (hereinafter simply referred to as a "user").

Further, part of data used by the analysis device 1 may be saved in a remote server or the like, and part of a calculation process executed by the analysis device 1 may be executed by the remote server or the like.

The inputter 4 is constituted by an input device such as a mouse, a keyboard, various buttons or a touch panel. The inputter 41 receives information and so on required for control of the measurer 100 or a process executed by the controller 50 from the user. Assumed concentrations of a subject compound and a reference compound or an m/z for detection of the reference compound and the subject compound is input via the inputter 41. The communicator 42 is constituted by a communication device that can communicate via wireless connection such as the Internet or wired communication, and suitably transmits and receives data and so on in regard to the control of the measurer 100 or a process executed by the controller 50.

The storage 43 is constituted by a non-volatile storage medium and stores measurement data, a program for execution of a process by the controller 50, data required for execution of a process by the data processor 52, data obtained by the process, etc.

In the storage 43, a numerical value representing a first relative response factor RRF1, described above, is stored.

In the storage 43, data based on a first relative response factor such as a first determination threshold value Th1, a second determination threshold value Th2 or an allowable range R1, described above, may be stored. Even in a case where the storage 43 does not store a first relative response factor RRF1, concentration change determination can be performed with the use of the data.

The outputter 44 is constituted by a display device such as a liquid crystal monitor, a printer or the like. The outputter 44 outputs a notification based on concentration change information or concentration change determination, or data or the like obtained by a process executed by the data processor 52 by displaying the notification, or the data or the like in the display device or printing the notification, or the data or the like using a printer.

The controller 50 includes a processor such as a CPU, and serves as a main constituent of behavior of the analysis device 1 by controlling the behavior of each component of the measurer 100, processing measurement data, etc.

The device controller 51 of the controller 50 controls the behavior of each component of the measurer 100. For example, the device controller 51 can detect ions In in a scan mode in which an m/z of ions passing through the mass separator 35 changes continuously or an SIM (Selective Ion Scanning) mode in which a plurality of ions having a specific m/z pass. In this case, the device controller 51 changes a voltage of the mass separator 35 such that ions In having an m/z that is set based on input from the inputter 41, or the like selectively pass through the mass separator 35.

The data processor 52 of the controller 50 processes and examines measurement data.

The coefficient acquirer 521 acquires a numerical value corresponding to a first relative response factor RRF1 stored in the storage 43 and causes a memory to store the numerical value for reference.

In a case where data based on a first relative response factor RRF1 such as a first determination threshold value Th1, a second determination threshold value Th2 or an allowable range R1, described above, is stored in the storage 43, the coefficient acquirer 521 acquires these numerical values and causes the memory to store these numerical values for reference.

The coefficient calculator 522 calculates a detected intensity of a reference compound and a detected intensity of at least one subject compound from the measurement data. In a case where mass spectrometry is performed in the SIM mode, the coefficient calculator 522 calculates an intensity of a reference compound and an intensity of a subject compound, corresponding to each set m/z, as intensities detected in correspondence with the m/z. In a case where mass spectrometry is performed in the scan mode, the coefficient calculator 522 produces data corresponding to a mass spectrum or the like from measurement data and calculates a peak intensity or a peak area of a peak corresponding to each of a reference compound and a subject compound as an intensity of the reference compound and an intensity of the subject compound.

The coefficient calculator 522 calculates a second relative response factor RRF2 of each subject compound with respect to a reference compound based on a detected intensity of the reference compound and a detected intensity of at least one subject compound. The coefficient calculator 522 calculates a second relative response factor RRF2 by the above-mentioned formula (5) with the use of intensities of a reference compound and a subject compound, and assumed concentrations in regard to the reference compound and the subject compound that are set based on input from the inputter 41, or the like.

The determiner 523 performs concentration change determination based on a first relative response factor RRF1 and a calculated second relative response factor RRF2. The determiner 523 calculates a first determination threshold value Th1 and a second determination threshold value Th2 based on a first relative response factor RRF1, and performs concentration change determination based on whether a second relative response factor RRF2 is in an allowable range R1 that is defined by the first determination threshold value Th1 and the second determination threshold value Th2. The determiner 523 functions as an information producer that produces concentration change information including a result of concentration change determination.

The output controller 53 produces an output image including concentration change information or the like obtained by a process executed by the data processor 52, and controls the outputter 44 and causes the outputter 44 to output the output image.

In a case where the concentration of a subject sample is changed as a result of concentration change determination, the notifier 530 of the output controller 53 outputs a notification for informing the user of the change. For example, in a case where it is determined that the concentration of a subject sample is changed as a result of concentration change determination performed by the determiner 523, the notifier 530 can cause the outputter 44 to output characters such as "PASS," "FAIL" or the like and can provide warning. In a case where a subject sample is a standard sample, the notifier 530 can cause the outputter 44 to output characters such as "Standard sample may be degraded." While a method of displaying such warning is not limited in particular, warning may be displayed as a pop-up message in a screen, for example. Even in a case where it is determined that the concentration of a subject sample is changed as a result of concentration change determination, the notifier 530 may cause the outputter 44 to output characters such as "PASS."

(Regarding Analysis Method)

Figure 5:
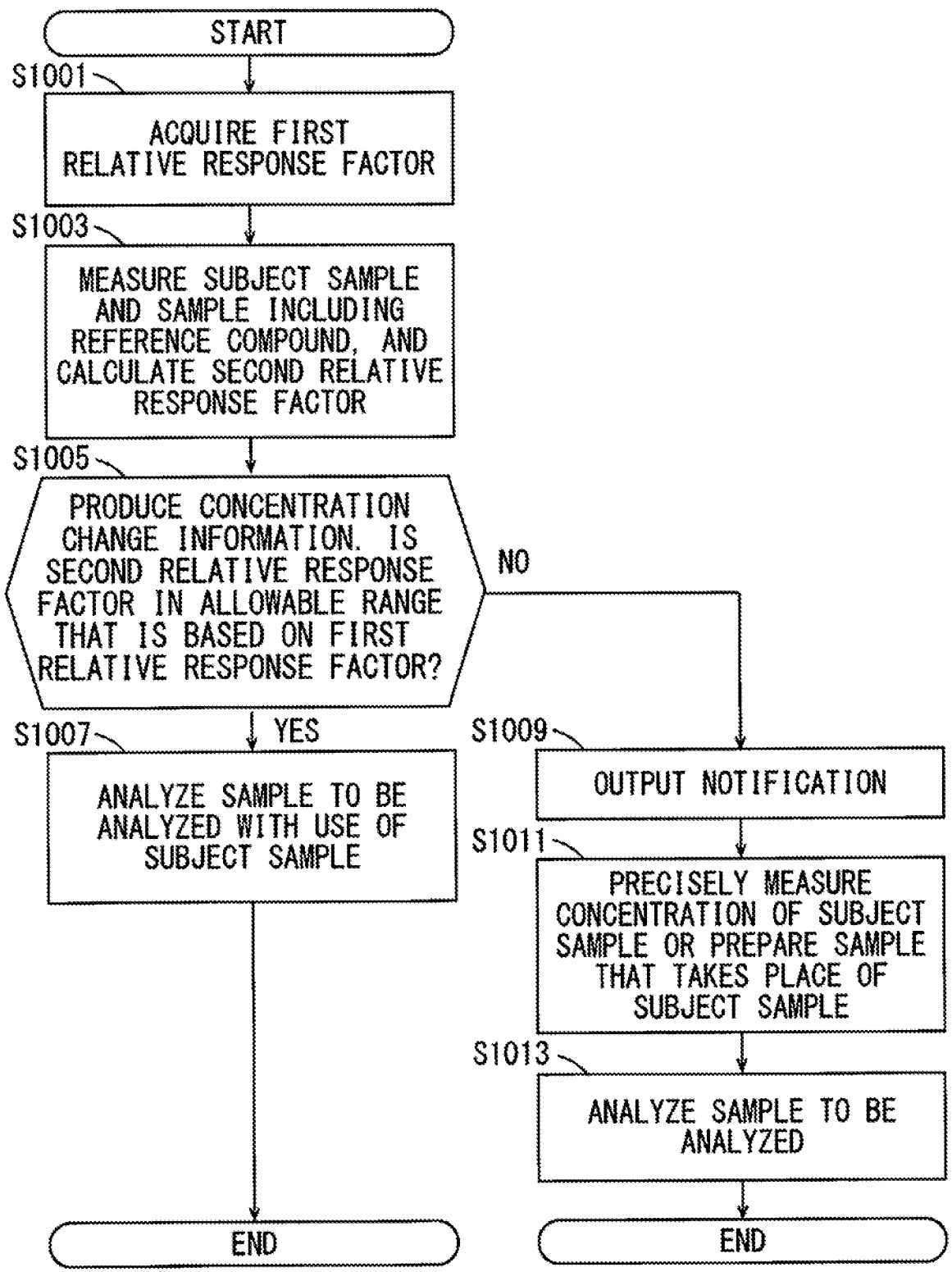
FIG. 5 is a flowchart showing a flow of an analysis method according to the one embodiment.

FIG. 5 is a flowchart showing a flow of an analysis method including the detection method of the present embodiment. In the step S1001, the coefficient acquirer 521 acquires a first relative response factor RRF1. When the step S1001 ends, the step S1003 is started. In the step S1003, the measurer 100 measures a subject sample and a sample including a standard compound, and the coefficient calculator 522 calculates a second relative response factor RRF2. When the step S1003 ends, the step S1005 is started.

In the step S1005, the determiner 523 determines whether the second relative response factor RRF2 is in an allowable range based on the first relative response factor RRF1 (concentration change determination). The determiner 523 produces concentration change information based on concentration change determination. In a case where the second relative response factor is in the allowable range, the determiner 523 makes affirmative determination of the step S1005, and the step S1007 is started. In a case where the second relative response factor is out of the allowable range, the determiner 523 makes negative determination of the step S1005, and the step S1009 is started.

In the step S1007, an analysis of a sample to be analyzed is performed with the use of a subject sample by the analysis device 1 based on the concentration change determination information. When the step S1007 ends, the process ends.

In the step S1009, the notifier 530 outputs a notification based on the concentration change determination. When the step S1009 ends, the step S1011 is started. In the step S1011, the user precisely measures a concentration of the subject sample for correction of measurement data or prepare a sample that takes the place of the subject sample. When the step S1011 ends, the step S1013 is started.

In the step S1013, the analysis device 1 performs an analysis of a sample to be analyzed. When the step S1013 ends, the process ends.

Following modifications is in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

In the above-mentioned embodiment, in a case where a plurality of reference compounds are used, whether a concentration of a subject component is changed can be determined based on how many reference compounds out of the plurality of reference compounds satisfies a condition for individual concentration change determination. Here, individual concentration change determination refers to concentration change determination that is performed in a case where the number of reference compounds is one, and is similar to the concentration change determination shown in FIGS. 2A and 2B of the above-mentioned embodiment. Further, a condition of individual concentration change determination refers to a condition on which determination is made that a concentration is not changed in the individual concentration change determination, and refers to a condition that a value of a second relative response factor RRF2 is in an allowable range R1 in the example of the above-mentioned embodiment.

FIGS. 6A, 6B and 7 are diagrams showing the charts for specifically explaining concentration change determination. In the below-mentioned charts of the present modified example, each of compounds A, B, C and D is a compound and also a subject compound. Suppose that concentrations of the compounds B, C and D are not changed while the compound A is degraded, and its concentration is lowered to about half.

The chart 6-A of FIG. 6A is a chart showing a result of individual concentration change determination in a case where the compound A is a reference compound. Although the concentrations of the compounds B, C and D are not changed, because the concentration of the reference compound A is lowered to about half, second relative response factors RRF2 are about twice of allowable ranges R1. As a result, determination is made that the concentration is changed although the concentrations of the compounds B, C and D are not changed.

The chart 6-B of FIG. 6B is a chart showing a result of individual concentration change determination in a case where the compound B is a reference compound on the assumption similar to that of FIG. 6A. Because the reference compound B the concentration of which is not changed is used as a reference, a result of accurate determination that the concentration of the subject compound A is changed and the concentrations of the subject compounds C and D are not changed is obtained in the chart 6-B.

In the concentration change determination (hereinafter referred to as integral concentration change determination) according to the present modified example, whether a concentration of a subject compound is changed is determined by how many reference compounds out of a plurality of reference compounds satisfies a condition for individual concentration change determination in regard to the one subject compound. With integral concentration change determination, even in a case where a concentration of part of a plurality of reference compounds is changed, likelihood of erroneous determination because of the change is lowered.

The chart 7 of FIG. 7 is a chart showing a result of integral concentration change determination in which results of individual concentration change determination of a subject compound with the compounds A, B, C and D respectively used as reference compounds are integrated. As shown in FIG. 6A, in a case where individual concentration change determination is performed with the degraded compound A used as a reference compound, a result of determination that the concentrations are changed in regard to all of the subject compounds B, C and D is obtained. On the other hand, in a case where concentration change determination is performed with the compounds B, C and D that are not degraded as reference compounds, a result of determination that the concentration is changed in regard to the degraded compound A, and the concentrations are not changed in regard to the compounds B, C and D that are not degraded is obtained.

The results of individual concentration change determination are integrated. As for the subject compound A, individual concentration change determination was performed with the use of the three reference compounds B, C and D, and it was determined that concentrations were changed in regard to all of the reference compounds. As for the subject compound B, individual concentration change determination was performed with the use of three reference compounds A, C and D, and it was determined that a concentration was changed in regard to one reference compound, and it was determined that concentrations were not changed in regard to two reference compounds. Also as for each of the subject compound C and the subject compound D, it was determined that a concentration was changed in regard to one reference compound, and it is determined that concentrations were not changed in regard to two reference compounds.

In a case where a concentration is not changed in regard to a predetermined number of reference compounds (here, two out of the three reference compounds) or more in individual concentration change determination with the use of a plurality of reference compounds, it is determined in integral concentration change determination that a concentration is not changed. Therefore, it is determined that the concentration of the subject compound A is changed in the integral concentration change determination, it is determined that the concentrations of the subject compounds B, C and D are not changed in the integral concentration change determination, and a result of accurate determination is obtained.

Although the compounds A, B, C and D are reference compounds and subject compounds in the above-mentioned example, even in a case where at least part of a plurality of reference compounds are different from a subject compound, a result of accurate determination can be obtained by integral concentration change determination in regard to a plurality of reference compounds. Further, the predetermined number of individual concentration change determination in integral concentration change determination is not limited to the above-mentioned example, and the number corresponding to 60% or more, 70% or more, 80% or more, or the like of the number of reference compounds can be set suitably.

Modified Example 2

In the above-mentioned embodiment, in a case where concentration change determination is performed multiple times, the data processor 52 can produce data (hereinafter referred to as relative response factor data) corresponding to a graph showing a change in calculated second relative response factor RRF2 over time. The output controller 53 can cause the outputter 44 to output an output image showing the graph.

Figure 8:
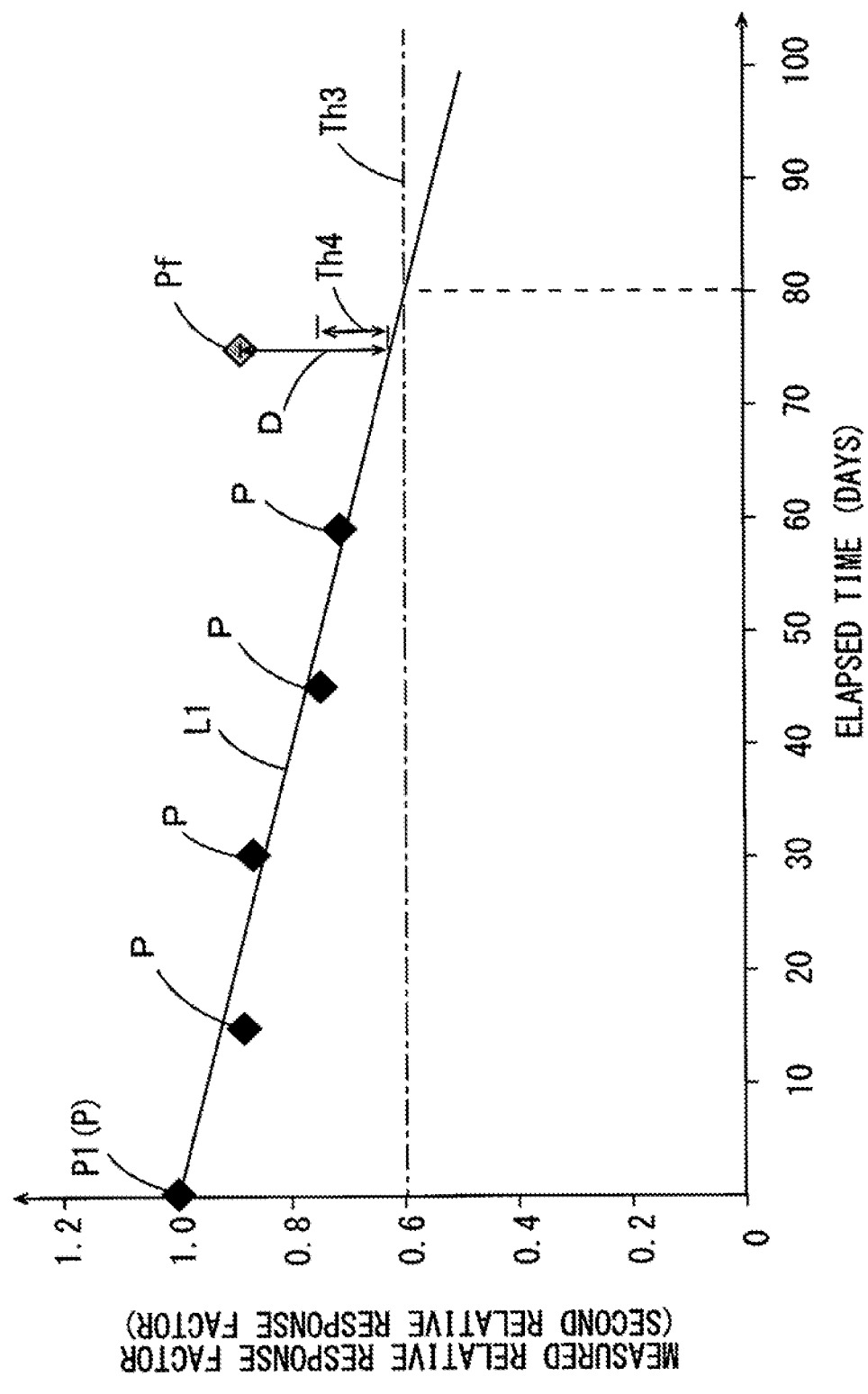
FIG. 8 is a graph showing a change of a relative response factor over time.

FIG. 8 is a diagram showing one example of a graph showing a change in second relative response factor RRF2 over time. A data acquisition period is indicated by the number of days from a date corresponding to a first data point P1 (hereinafter referred to as a first day) on the abscissa, and a data point P corresponding to actual measurement is plotted in the graph having the ordinate representing a value of a measured second relative response factor RRF2. A unit of time for the abscissa or a numerical value for the ordinate can be suitably set.

The data processor 52 can estimate the time when a subject sample is to be replaced based on relative response factor data. The data processor 52 derives a regression line L1 by a least squares method or the like based on a plurality of data points P. The data processor 52 calculates a period (80 days from the first day in FIG. 8) in which a second relative response factor RRF2 is lower than a threshold value that is used as a reference for degradation of a sample. The data processor 52 produces information including a time when the calculated subject sample is to be replaced, or the like and causes the outputter 44 to output the information.

Modified Example 3

In the modified example 2, after estimation is performed based on the regression line L1, in a case where a measured value of the second relative response factor RRF2 completely misses estimation that is based on the regression line L1, it is considered that there may be a problem with measurement of a subject sample or a sample including a reference compound. This problem may be detected, and the user may be notified of the problem.

In FIG. 8, from the estimation based on the regression line L1, an estimation value of a second relative response factor RRF2 is about 0.63 on the 75th day from the first day. The data processor 52 calculates a difference D between an actually measured second relative response factor RRF2 and an estimation value based on the regression line L1, and produces information in regard to reliability of measurement (hereinafter referred to as reliability information). In a case where the difference D is equal to or larger than a threshold value (hereinafter referred to as a fourth determination threshold value Th4) that is set based on accuracy of analysis or the like, the data processor 52 determines that measurement is not sufficiently accurate and produces reliability information representing inaccuracy of measurement. In a case where the difference D is equal to or smaller than the fourth determination threshold value, the data processor 52 determines that measurement is not sufficiently accurate and produces reliability information representing inaccuracy of measurement. The reliability information is suitably output via the outputter 44.

In a case where it is determined that measurement is not sufficiently accurate, the notifier 530 notifies the user of inaccuracy of measurement via the outputter 44. Also in a case where it is determined that measurement is sufficiently accurate, the notifier 530 may notify the user of accuracy of measurement.

Modified Example 4

A program for implementing an information processing function of the analysis device 1 may be recorded in a computer-readable recording medium. A computer system may read the program, which is recorded in the recording medium, in regard to the control of a process to be executed by the above-mentioned data processor 52 and its related processes and execute the program. A "computer system" here includes hardware such as an OS (Operating System) or peripheral appliances. Further, a "computer-readable recording medium" refers to a movable recording medium such as a flexible disc, an optical magnetic disc, an optical disc or a memory card and a storage device such as a hard disc built into the computer system. Further, a "computer-readable recording medium" may include an object that retains a program movably for a short period of time such as a communication wire that is used when a program is transmitted through a network such as the Internet or a communication line such as a telephone line, or an object that retains a program for a certain period of time such as a volatile memory in a computer system that serves as a server or a client. Further, the above-mentioned program may be to implement part of the above-mentioned functions and may further be to implement the above-mentioned functions by being combined with a program that has already been recorded in the computer system.

Figure 9:
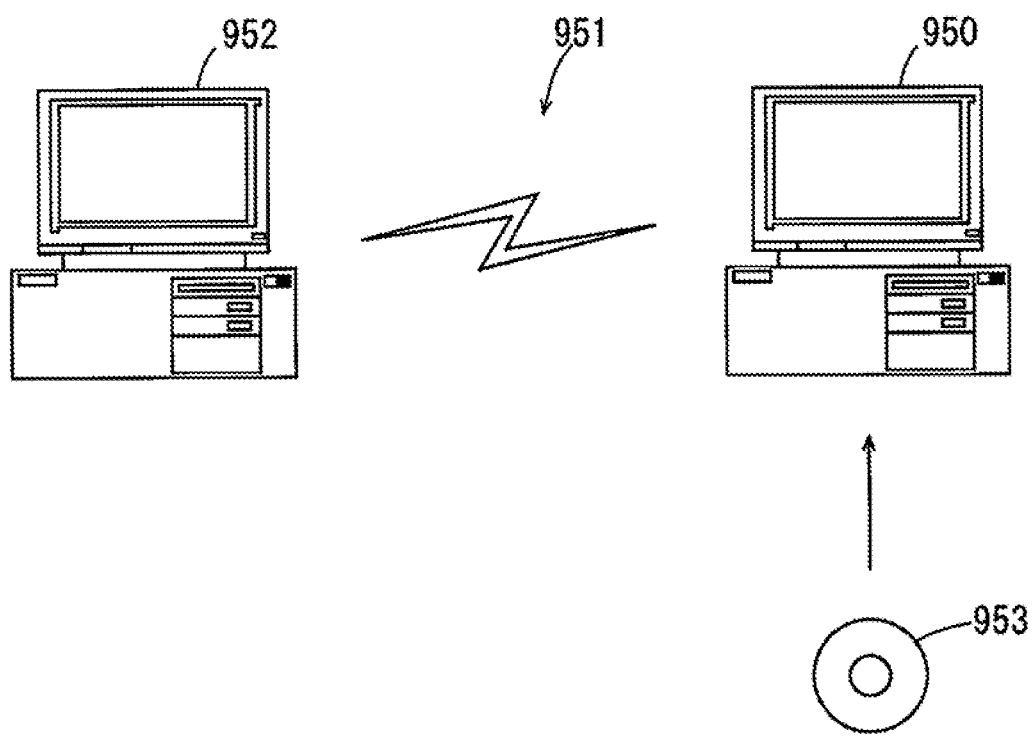
FIG. 9 is a conceptual diagram for explaining a program.

Further, in a case where being applied to a personal computer (hereinafter referred to as a PC), the program relating to the above-mentioned control can be provided via a recording medium such as a CD-ROM or a DVD-ROM, or a data signal such as the Internet. FIG. 9 is a diagram showing the appearance. A PC 950 receives a program via a CD-ROM 953. Further, the PC 950 has a function to be connected to a communication line 951. The computer 952 is a server computer that provides the above-mentioned program and stores the program in a recording medium such as a hard disc. The communication line 951 is a communication line such as the Internet or a personal computer communication, or a dedicated communication line. The computer 952 reads a program with the use of the hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

With the above-mentioned embodiments and the modified examples, the following effects are obtained.

(1) In an embodiment according to a first aspect, a detection method of detecting a change in concentration of a subject sample includes acquiring at least one first relative response factor obtained by measurement of a sample having a same component as at least one component included in the subject sample at a known concentration and a sample having at least one compound (reference compound) at a known concentration, or at least one first threshold value based on each of the at least one first relative response factor, measuring the subject sample and a sample including the at least one compound, and calculating at least one second relative response factor in regard to at least one component of the subject sample and the at least one compound, and producing first information (concentration change information) in regard to a change in concentration of the subject sample based on the at least one first relative response factor or the at least one first threshold value, and the corresponding at least one second relative response factor. Thus, a change in concentration of a reagent can be detected without a complicated operation.

(2) In an embodiment according to a second aspect, in the detection method of the first aspect, whether the concentration of the subject sample is changed is determined based on whether the at least one second relative response factor satisfies a condition that is based on at least one first threshold value, which is based on each of the corresponding at least one first relative response factor. Thus, whether the concentration of a reagent is changed can be determined precisely based on a threshold value.

(3) In an embodiment according to a third aspect, the detection method of the second aspect includes acquiring a plurality of first relative response factors obtained by an analysis of a sample having a same component as at least one component included in the subject sample at a known concentration and a sample having a plurality of compounds at known concentrations, or a plurality of first threshold values respectively based on the plurality of first relative response factors, measuring the subject sample and a sample including the plurality of compounds and calculating a plurality of second relative response factors in regard to at least one component of the subject sample and the plurality of compounds, and determining whether a concentration of each of the at least one component is changed based on how many compounds out of the plurality of compounds satisfies the condition with respect to each of at least one component of the subject sample. Thus, even in a case where the concentration of any of a plurality of reference compounds is changed, accuracy of detection in regard to whether a concentration of a subject compound is changed can be prevented from being degraded.

(4) In embodiment of a fourth aspect, in the detection method of any of the first to third aspects, the at least one compound includes Di-(2-ethylhexyl) phthalate (DEHP). Because DEHP is stable, in a case where DEHP is a reference compound, it is not necessary to check whether its concentration is changed for a long period of time, and this reduces time and labor.

(5) In an embodiment of a fifth aspect, in the detection method of any of the first to fourth aspects, the at least one component includes an ester of phthalic acid. Thus, when an important analysis of an ester of phthalic acid that is used as a regulated substance or for industrial use is performed, time and labor can be reduced.

(6) In an embodiment of a sixth aspect, in the detection method of a fifth aspect, the at least one component is one or more compounds selected from a group including DIBP, DBP, BBP, DEHP, DNOP, DINP, DIDP, Mono(2-ethylhexyl) phthalate, DMP, DEP, DPRP, Bis (2-methoxyethyl) phthalate, Bis(2-butoxyethyl) phthalate, N-pentyl-isopentyl phthalate, Dipropylheptyl phthalate, DPP, DPENP, DHP, Diisohexyl phthalate, DCHP, Dibenzyl phthalate, Diheptyl phthalate, Diisoheptyl phthalate, Dinonyl phthalate, Didecyl phthalate, Diundecyl phthalate, Diisoundecyl phthalate and Diisotridecyl phthalate. Thus, when an important analysis of these esters of phthalic acid that are used as regulated substances or for industrial use is performed, time and labor can be reduced.

(7) In an embodiment of a seventh aspect, the detection method of any of the first to sixth aspects includes outputting a notification based on the first information. Thus, the user can be notified of information in regard to a concentration of a reagent in a comprehensible manner.

(8) In an embodiment of an eighth aspect, the detection method of any of the first to seventh aspects includes performing a measurement of the subject sample and a sample including the at least one compound multiple times and calculating the second relative response factor corresponding to each of the measurement performed multiple times, and producing second information in regard to estimation of degradation of the sample based on a plurality of the calculated second relative response factors. Thus, information in regard to degradation of a sample can be provided to the user without a complicated operation.

(9) In an embodiment of a ninth aspect, the detection method of the eighth aspect includes producing third information (reliability information) in regard to reliability of actual measurement based on a difference between an estimation value of the second relative response factor based on the second information and a value of the second relative response factor obtained by the actual measurement. Thus, information in regard to reliability of measurement can be provided without a complicated operation.

(10) In an embodiment of a tenth aspect, in the detection method of the ninth aspect, whether the actual measurement is sufficiently accurate is determined based on whether the difference satisfies a condition based on a second threshold value. Thus, whether measurement is sufficiently accurate can be determined precisely.

(11) In an embodiment of an eleventh aspect, the detection method of the ninth or tenth aspect includes outputting a notification based on the third information. Thus, the user can be notified of information in regard to reliability of measurement in a comprehensible manner.

(12) In an embodiment of a twelfth aspect, an analysis method includes producing first information in regard to whether a concentration of a subject sample is changed by the detection method of any one of the first to eleventh aspect and performing an analysis using the subject sample based on the first information. Thus, an analysis can be performed accurately with reference to concentration change information without a complicated operation.

(13) In embodiment of a thirteenth aspect, an analysis device includes a first relative response factor acquirer that acquires at least one first relative response factor obtained by measurement of a sample having a same component as at least one component included in a subject sample at a known concentration and a sample including at least one compound (reference compound) at a known concentration, or at least one first threshold value based on each of the at least one first relative response factor, a measurer that measures the subject sample and a sample including the at least one compound, a second relative response factor calculator that calculates at least one second relative response factor in regard to at least one component of the subject sample and the at least one compound based on measurement data obtained by the measurement, and an information producer that produces first information (concentration change information) in regard to a change in concentration of the subject sample based on the at least one first relative response factor or the at least one first threshold value, and the corresponding at least one second relative response factor. Thus, a change in concentration of a reagent can be detected without a complicated operation.

(14) In an embodiment of a fourteenth aspect, a program stored in a non-transitory computer readable medium causes a processing device to execute a first relative response factor acquisition process (corresponding to the step S1001 of FIG. 5) of acquiring at least one first relative response factor obtained by measurement of a sample having a same component as at least one component included in a subject sample at a known concentration and a sample including at least one compound at a known concentration, or at least one first threshold value based on each of the at least one first relative response factor, a second relative response factor calculation process (corresponding to the step S1003) of calculating at least one second relative response factor in regard to at least one component of the subject sample and the at least one compound based on measurement data obtained by measurement of the subject sample and a sample including the at least one compound, and an information production process (corresponding to the step S1005) of producing first information (concentration change information) in regard to a change in concentration of the subject sample based on the at least one first relative response factor or the at least one first threshold value, and the corresponding at least one second relative response factor. Thus, a change in concentration of a reagent can be detected without a complicated operation.

The present invention is not limited to the contents of the above-mentioned embodiment. Other embodiments are possible without departing from the spirit and scope of the present invention.

REFERENCE SIGNS LIST

1 . . . Analysis device, 10 . . . Gas chromatograph, 12 . . . Sample introducer, 14 . . . Separation column, 30 . . . Mass Spectrometry Unit, 33 . . . Ionizer, 35 . . . Mass separator, 36 . . . Detector, 40 . . . Information processor, 44 . . . Outputter, 50 . . . Controller, 52 . . . Data processor, 100 . . . Measurer, 521 . . . Coefficient acquirer, 522 . . . Coefficient calculator, 523 . . . Determiner, 530 . . . Notifier, In . . . Ions, D . . . Difference, L1 . . . Regression line, P, P1, Pf . . . Data points, R1 . . . Allowable range, RRF1 . . . First relative response factor, RRF2 . . . Second relative response factor, Th1 . . . First determination threshold value, Th2 . . . Second determination threshold value, Th3 . . . Third determination threshold value, Th4 . . . Fourth determination threshold value

The invention claimed is:

1. An analysis method, comprising:
   detecting of a first intensity of at least one component in a subject sample and a second intensity of at least one compound in a reference sample by a first analysis device, the at least one component included in the subject sample being provided at a known concentration, and the at least one compound in the reference sample also being provided at a known concentration;
   calculating at least one first relative response factor based on a relationship between the first intensity of the at least one component in the subject sample and the second intensity of the at least one compound in the reference sample by the first analysis device;
   at a time after the detecting by the first analysis device, detecting a third intensity of the at least one component in the subject sample and a fourth intensity of the at least one compound in the reference sample by a second analysis device that is a same model as the first analysis device;
   calculating at least one second relative response factor based on a relationship between the third intensity of the at least one component in the subject sample and the fourth intensity of the at least one compound in the reference sample by the second analysis device;
   determining whether the at least one second relative response factor is within an allowable range with respect to the at least one first relative response factor;
   based on a determination that the at least one second relative response factor is within the allowable range, conducting an analysis of a sample to be analyzed using a previously obtained calibration curve created based on the subject sample; and
   based on a determination that the at least one second relative response factor is not within the allowable range, conducting the analysis of the sample to be analyzed using an updated concentration measurement for the subject sample or using a new subject sample;
   wherein the at least one component includes an ester of phthalic acid.

2. The detection method according to claim 1, including:
   the calculating at least one first relative response factor comprises calculating a plurality of first relative response factors by measurement of the first intensity of the at least one component in the subject sample and second intensities of a plurality of compounds in the reference sample at known concentrations by the first analysis device,
   the calculating at least one second relative response factor comprises calculating a plurality of second relative response factors by measurement of the third intensity of the at least one component in the subject sample and fourth intensities of a plurality of compounds in the reference sample by the second analysis device that is the same model as the first analysis device.

3. The detection method according to claim 1, wherein the at least one compound includes Di-(2-ethylhexyl) phthalate (DEHP).

4. The detection method according to claim 1, wherein the at least one component is one or more compounds selected from a group consisting of Diisobutyl phathalate (DIBP), Dibutyl phthalate (DBP), Butylbenzyl phthalate (BBP), Di-(2-ethylhexyl) phthalate (DEHP), Di-n-octyl phthalate (DNOP), Diisononyl phathalate (DINP), Diisodecyl phthalate (DIDP), Mono (2-ethylhexyl) phthalate, Dimethyl phthalate (DMP), Diethyl phthalate (DEP), Dipropyl phthalate, Bis(2-methoxyethyl) phthalate, Bis(2-butoxyethyl) phthalate, N-pentyl-isopentyl phthalate, Dipropylheptyl phthalate, Di-n-pentyl phthalate (DPENP), Diisopentyl phthalate (DPENP), Di-n-hexylphthalate (DHEXP), Diisohexyl phthalate, Dicyclohexyl phthalate (DCHP), Dibenzyl phthalate, Diheptyl phthalate, Diisoheptyl phthalate, Dinonyl phthalate, Didecyl phthalate, Diundecyl phthalate, Diisoundecyl phthalate and Diisotridecyl phthalate.

5. The detection method according to claim 1, including:
performing multiple measurements of the subject sample and the reference sample including the at least one compound and calculating the second relative response factor corresponding to each of the measurements; and
estimating degradation of the sample based on a plurality of the calculated second relative response factors.

6. An analysis device, comprising:
at least one processor configured to
detect a first intensity of at least one component in a subject sample and a second intensity of at least one compound in a reference sample by a first analysis device, the at least one component included in the subject sample being provided at a known concentration, and the at least one compound in the reference sample also being provided at a known concentration;
calculate at least one first relative response factor based on a relationship between the first intensity of the at least one component in the subject sample and the second intensity of the at least one compound in the reference sample by the first analysis device;
at a time after the detecting by the first analysis device, detect a third intensity of the at least one component in the subject sample and a fourth intensity of the at least one compound in the reference sample by a second analysis device that is a same model as the first analysis device;
calculate at least one second relative response factor based on a relationship between the third-intensity of the at least one component in the subject sample and the fourth intensity of the at least one compound in the reference sample by the second analysis device;
determine whether the at least one second relative response factor is within an allowable range with respect to the at least one first relative response factor;
based on a determination that the at least one second relative response factor is within the allowable range, conduct an analysis of a sample to be analyzed using a previously obtained calibration curve created based on the subject sample; and
based on a determination that the at least one second relative response factor is not within the allowable range, control the analysis of the sample to be analyzed using an updated concentration measurement for the subject sample or using a new subject sample;
wherein the at least one component includes an ester of phthalic acid.

7. A non-transitory computer readable medium storing a program causing a processing device to:
detect a first intensity of at least one component in a subject sample and a second intensity of at least one compound in a reference sample by a first analysis device, the at least one component included in the subject sample being provided at a known concentration, and the at least one compound in the reference sample also being provided at a known concentration;
calculate at least one first relative response factor based on a relationship between the first intensity of the at least one component in the subject sample and the second intensity of the at least one compound in the reference sample by the first analysis device;
at a time after the detecting by the first analysis device, detect a third-intensity of the at least one component in the subject sample and a fourth intensity of the at least one compound in the reference sample by a second analysis device that is a same model as the first analysis device;
calculate at least one second relative response factor based on a relationship between the third intensity of the at least one component in the subject sample and the fourth intensity of the at least one compound in the reference sample by the second analysis device;
determine whether the at least one second relative response factor is within an allowable range with respect to the at least one first relative response factor;
based on a determination that the at least one second relative response factor is within the allowable range, conduct an analysis of a sample to be analyzed using a previously obtained calibration curve created based on the subject sample; and
based on a determination that the at least one second relative response factor is not within the allowable range, control the analysis of the sample to be analyzed using an updated concentration measurement for the subject sample or using a new subject sample;
wherein the at least one component includes an ester of phthalic acid.

* * * * *